United States Patent [19]

Day

[11] 4,161,865
[45] Jul. 24, 1979

[54] STEERING CONTROL WITH HYDRAULIC FOLLOW-UP

[75] Inventor: Ralph R. Day, Aurora, Ill.

[73] Assignee: Caterpillar Tractor Co., Peoria, Ill.

[21] Appl. No.: 872,977

[22] Filed: Jan. 27, 1978

[51] Int. Cl.² .................... F15B 9/02; F15B 13/06
[52] U.S. Cl. ................................ 60/385; 60/386; 91/358 R; 180/152
[58] Field of Search ............... 60/384, 385, 386, 473; 91/368, 388, 391 R; 180/139, 152, 153; 91/358 R

[56] References Cited
U.S. PATENT DOCUMENTS

| 3,358,711 | 12/1967 | Pruvot | 60/384 |
| 3,520,135 | 7/1970 | Liebert | 60/386 X |

Primary Examiner—Edgar W. Geoghegan
Attorney, Agent, or Firm—Wagner, Stellman, McCord, Wiles & Wood

[57] ABSTRACT

A steering control with a hydraulic follow-up wherein a movable valve member of a control valve is automatically brought back to a nonsteering disposition as a result of the movement of the device being steered to the desired steering position. Movement of the device is effected by a pair of steering cylinders. Control of the movable valve member is effected by a variable volume storage device which receives hydraulic fluid from the control valve and returns the fluid to the control valve as a function of the relationship of the steering mechanism and device to be steered.

22 Claims, 3 Drawing Figures

STEERING CONTROL WITH HYDRAULIC FOLLOW-UP

BACKGROUND OF THE INVENTION

1. Field of the Invention

This invention relates to vehicle steering controls and in particular to hydraulically operated steering controls.

2. Description of the Prior Art

In one conventional form of steering control, a hydraulic fluid supply is provided for operating suitable power means to effect the steering, or turning, movement of the device to be steered. Such operation of the steering means may be effected by hydraulic cylinder devices wherein pistons are selectively positioned under the control of the steering wheel of the vehicle.

SUMMARY OF THE INVENTION

The present invention is concerned with an improved control valve for use in such a hydraulic steering system wherein an automatic follow-up is provided in a new and improved manner for retaining the steering device in the adjusted steered position while yet providing facilitated repositioning of the device as desired by further control of the steering wheel of the vehicle.

More specifically, the invention comprises the provision in a hydraulically operable steering mechanism having a manually operable steering element, a steering cylinder including wall means defining a piston chamber and a piston movable in the chamber, connecting means for connecting the piston to the device to be steered, pump means for providing pressurized hydraulic steering fluid, a control valve having a movable valve member for controlling the delivery of pressurized fluid from the pump means to the piston chamber selectively to opposite sides of the piston therein to urge the connecting means selectively in opposite directions for effecting a steering movement of the device to be steered, means for biasing the valve member to a nonsteering disposition, hydraulic means for moving the movable valve member, as an incident of selective disposition of the steering element, from the nonsteering disposition to cause delivery of pressurized hydraulic fluid to the piston chamber selectively to effect a corresponding steering movement of the device to be steered, and restoring means responsive to movement of the device to be steered to hydraulically move the valve member back to the nonsteering disposition as a result of the drive being disposed in the steering disposition corresponding to the selective steering disposition of the steering element.

In the illustrated embodiment, the control valve comprises a spool valve with the restoring means serving to recenter the spool valve when the device is disposed in the steering position corresponding to the position of the steering wheel.

The steering element may comprise a manually controlled pump for delivering hydraulic fluid to the valve chamber at either end of the spool valve therein as a function of turning of the associated steering wheel so as to effect a desired placement of the movable valve member corresponding to the amount of movement and direction of movement of the steering wheel.

The restoring means may comprise a storage chamber having a variable volume as a function of the disposition of the device being steered. A pair of such variable chambers are provided connected to the opposite ends of the spool valve and arranged to receive from the valve and deliver to the valve at the opposite ends thereof hydraulic fluid whereby the spool valve member is automatically centered upon the device being steered being disposed in a position corresponding to the disposition of the steering wheel.

Thus, once the device being steered is turned to the desired position, it will be retained in that position as long as the operator maintains the steering wheel in that position, as the control valve is restored to the nonsteering disposition under such conditions. However, upon any movement of the steering wheel from that disposition, the control valve will again be actuated to effect a further steering movement of the steerable device in accordance with that further movement of the steering wheel. Thus, the steering system of the present invention effects a desired movement of the device to be steered whenever there is a differential between the disposition of the steering wheel and that device and maintains that device in the steering disposition as long as the steering wheel is maintained in a selected steering disposition. This operation is effected by automatic hydraulic follow-up action of the control valve effected by the restoring means associated with the individual piston cylinders.

The steering mechanism is arranged to provide a steering operation notwithstanding the failure of the fluid pressure supply pump such as might result from a dead engine or pump failure. The mechanism permits the operator to cause hydraulic operation of the steering means by suitable forceful effort applied to the steering wheel.

By utilizing an automatic follow-up action restoring the steering mechanism to the neutral position when the steering operation is concluded with the steering wheel retained in the turned position, the need for steering stops and means for relieving high pressures at the end of the steering travel are obviated, thereby simplifying and reducing the cost of the mechanism.

The steering mechanism of the present invention is extremely compact and requires only the use of special steering cylinders and valve means. The operating structure of the mechanism is effectively protected within the cylinder housing thereof so that only two external fluid supply lines are exposed, thereby minimizing vulnerability of the structure to damage and the like in the use of the vehicle.

The hydraulically operable steering mechanism of the present invention is extremely simple and economical of construction while yet providing the highly desirable features discussed above.

BRIEF DESCRIPTION OF THE DRAWING

Other features and advantages of the invention will be apparent from the following description taken in connection with the accompanying drawing wherein.

DESCRIPTION OF THE PREFERRED EMBODIMENT

Figure 1:
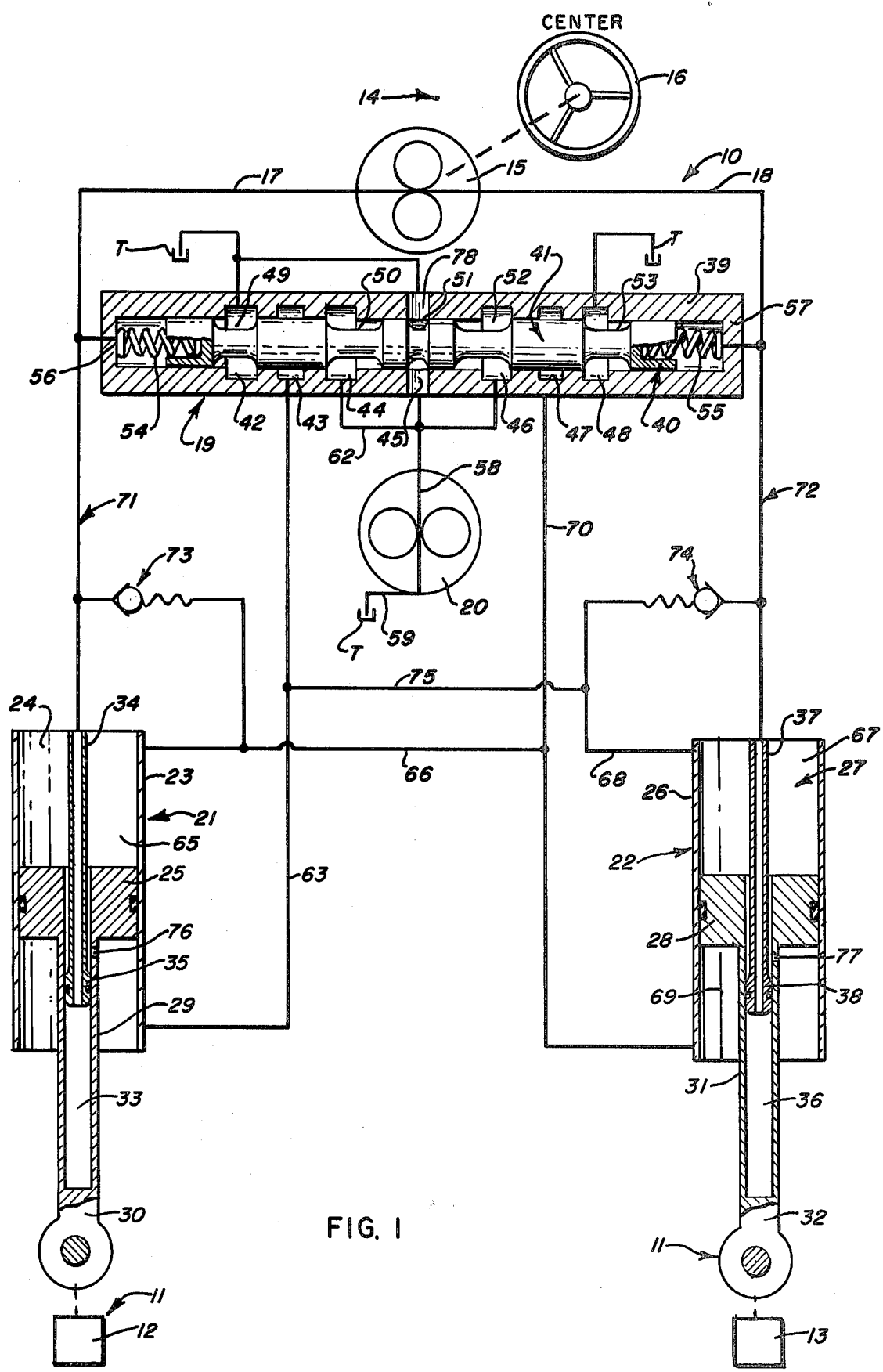
FIG. 1 is a schematic hydraulic diagram illustrating the structure of the present invention, with the mechanism arranged as in a steady state, nonturning disposition.

In the exemplary embodiment of the invention as disclosed in the drawing, a hydraulically operable steering mechanism generally designated 10 is provided for controlling the steerable device 11 such as of a vehicle. In the illustrated embodiment, the steerable device includes a pair of steerable portions 12 and 13, it being understood that the invention comprehends the operation of the mechanism in connection with a unitary steering mechanism, as desired.

The mechanism includes a manually operable steering element generally designated 14 which may include a hydraulic pump 15 and a steering wheel 16. As shown in FIG. 1, the steering wheel is connected to the pump so as to effect a positive displacement of hydraulic fluid from the pump in either direction through a first conduit 17 or a second conduit 18 depending on the direction of movement of the steering wheel 16. Flow of the hydraulic fluid effected by operation of pump 15 is directed to a control valve generally designated 19 which controls the delivery of pressurized hydraulic fluid from a suitable power-driven hydraulic pump 20 to a first steering cylinder generally designated 21 and a second steering cylinder generally designated 22.

As shown in FIG. 1, steering cylinder 21 is defined by a wall means 23 defining a piston chamber 24 in which is movably received a first piston 25. Second steering cylinder 22 is defined by a wall means 26 defining a piston chamber 27 in which is movably received a second piston 28.

Piston 25 is provided with a piston rod 29 extending outwardly from one end of the piston chamber and defining connecting means 30 for connecting the piston 25 to the device 12.

Piston 28 is provided with a piston rod 31 extending outwardly from the piston chamber 27 and defining a connector 32 for connecting the piston 28 to device 13.

As further shown in FIG. 1, the piston rod 29 defines a chamber 33 which opens through the piston 25 to receive a tubular probe 34 opening outwardly through the cylinder 23 oppositely of the piston rod 29. The probe includes a head portion 35 sealingly slidably received within the piston rod 29 so as to cause the chamber 33 to define a variable volume chamber as a function of the disposition of the piston and piston rod in the piston chamber 24.

Similarly, piston rod 31 defines a chamber 36 opening through piston 28. A second tubular probe 37 opens outwardly from the cylinder 26 oppositely to the piston rod 31 and includes a head portion 38 sealingly slidably received within the piston rod 31 causing the chamber 36 to define a variable volume chamber as a function of the disposition of the piston 28 and piston rod 31 in piston chamber 27.

As further shown in FIG. 1, the control valve 19 herein comprises a spool valve having an outer housing 39 defining a valve chamber 40 in which is slidably received a movable spool valve member 41. Housing 39 may be provided with a plurality of radially inwardly opening annular passages 42, 43, 44, 46, 47 and 48. Movable valve member 41 may be provided with a plurality of radially outwardly opening annular passages 49, 50, 51, 52 and 53. Radial ports 45 and 78 are provided in housing 39 to have communication with passage 51 in the centered arrangement of the valve as shown in FIG. 1.

The movable valve member 41 is biased to the centered, nonsteering disposition by suitable biasing means including first spring 54 and second spring 55 compressed between opposite ends of the spool valve member 41 and the opposite ends 56 and 57 of the housing 39.

The outlet passage 58 of pump 20 is connected to housing passage 45 and the inlet 59 of pump 20 is connected to tank T. Housing passages 42, 45 and 78 are further connected to tank T to provide a maintained, constant volume flow of pressurized fluid from the pump 20 in the centered condition of the control valve, as shown in FIG. 1.

Figure 2:
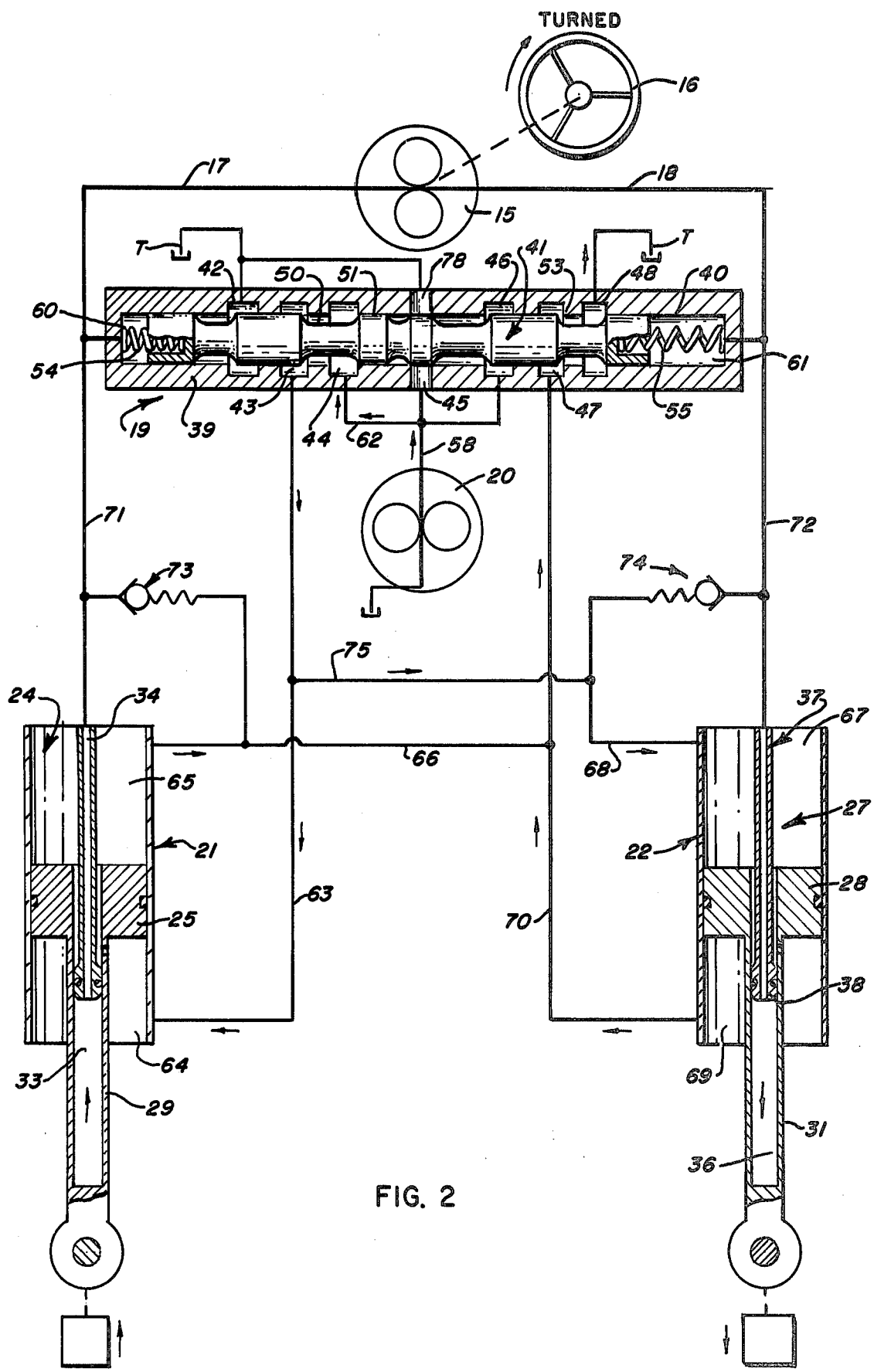
FIG. 2 is a schematic hydraulic diagram illustrating the arrangement of the mechanism as upon the turning of the steering wheel by the operator of the vehicle to initiate a steering movement of the steerable portion of the vehicle.

In the centered disposition of valve member 41, no delivery of pressurized fluid is effected to either of the steering cylinders 21 or 22. However, as shown in FIG. 2, the steering element passage 17 is connected to one end 60 of the valve chamber 40 and passage 18 is connected to the opposite end 61 thereof. Thus, when the steering wheel 16 is turned from the centered position of FIG. 1, pump 15 connected thereto causes a delivery of hydraulic fluid under pressure to either chamber end 60 or 61 depending on the direction of turning of the steering wheel. FIG. 2 illustrates the arrangement of the mechanism when the steering wheel has been turned so as to cause pump 15 to deliver hydraulic fluid through passage 18 to the valve chamber end portion 61 so as to cause movement of the spool valve member 41 to the left. Such movement of the spool valve member causes a delivery of pressurized fluid from pump 20 to a transfer conduit 62 to housing passage 44 through the spool valve member passage 50 to the housing passage 43. Housing passage 43 is connected by means of a conduit 63 to one end 64 of piston chamber 24 so as to urge the piston 25 upwardly, as seen in FIG. 2. The opposite end 65 of chamber 24 is connected through a conduit 66 to housing passage 47 which, in the displaced disposition of the spool valve 41, is connected to the housing passage 48 through the movable valve member passage 53. Housing passage 48 is connected to tank T and, thus, as a result of the positioning of the movable valve member 41 in the disposition of FIG. 2, a hydraulic circuit is completed so as to urge the piston 25 upwardly, as seen in FIG. 2.

As further shown in FIG. 2, the upper end 67 of piston chamber 27 of piston cylinder 22 is connected to conduit 63 by a transfer conduit 68 and the lower end 69 of chamber 27 is connected to conduit 66 by a transfer conduit 70.

Thus, concurrently with the upward movement of piston 25, downward movement of piston 28 is effected by the pressurized hydraulic fluid delivered from pump 20 and returned to tank T through the control valve 19.

As further shown, tubular probe 34 is connected to conduit 17 by a transfer conduit 71 and tubular probe 37 is connected to conduit 18 by a transfer conduit 72. A dead engine steering check valve generally designated 73 is connected between conduit 71 and conduit 66 and a similar dead engine steering check valve generally designated 74 is connected between conduit 68 and conduit 72. An interconnecting conduit 75 is connected between conduits 63 and 68.

Figure 3:
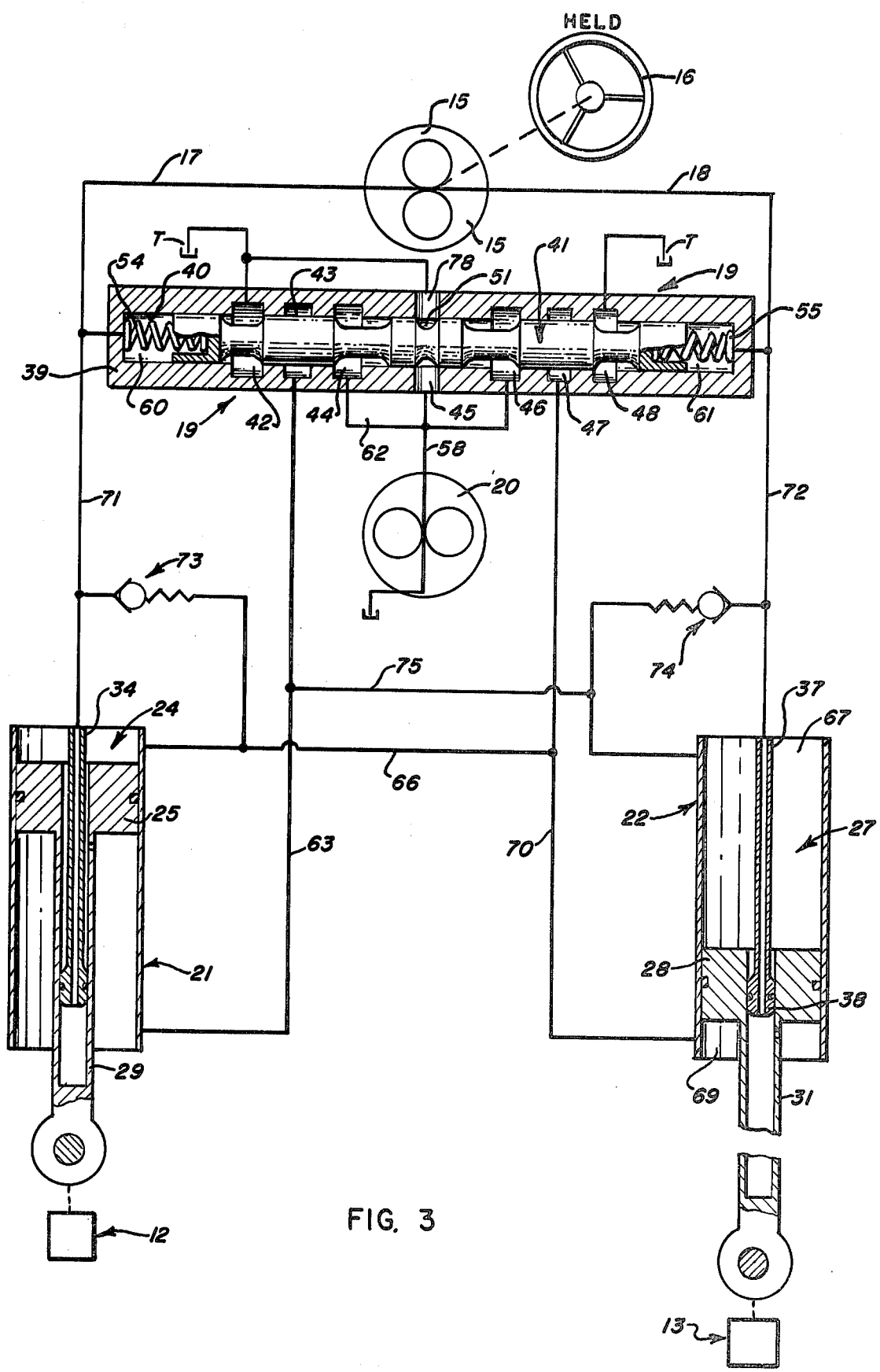
FIG. 3 is a schematic hydraulic diagram illustrating the steady state condition of the mechanism with the steering wheel and steerable portion of the vehicle being held in a selected turned disposition.

The operation of steering mechanism 10 may be seen by reference successively to FIGS. 1, 2 and 3. As illustrated in FIG. 1, the mechanism is arranged with the control valve 19 in a centered position when the steering device 14 is in a centered position corresponding to a straightahead steering of the vehicle. Pistons 25 and 28 are similarly in a centered position in the steering cylinders 21 and 22, respectively, whereby the steerable device portions 12 and 13 are arranged for a straightahead steering condition.

Referring now to FIG. 2, when the operator turns the steering wheel 16 such as to the position illustrated therein, such movement of the steering wheel causes a corresponding operation of pump 15 so as to direct hydraulic fluid through conduit 18 into valve chamber end 61 urging the spool valve member 41 to the left against the biasing action of spring 54. The movement of the spool valve member 41 to the disposition of FIG. 2 permits hydraulic fluid to be provided under pressure from pump 20 through conduit 62, passage 44, passage 50, passage 43, and conduit 63 into the lower end 64 of the piston chamber 24, thereby urging the piston 25 upwardly. At the same time, fluid is discharged from the upper portion 65 of the piston chamber through conduit 66, conduit 70, passage 47, passage 53, and passage 48 to tank T.

The upward movement of piston 25 carried with it the piston rod 29 thereby causing the chamber 33 to be decreased in volume by the introduction of the head 35 of tubular probe 34 thereinto as a result of the upward movement. The hydraulic fluid displaced by this relative movement flows through conduit 71 into end 60 of the valve chamber 40.

Concurrently, the displacement of the spool valve 41 to the leftward position of FIG. 2 permits pressurized fluid from pump 20 to pass from conduit 63 through interconnecting conduit 75 and conduit 68 into the upper portion 67 of the piston chamber 27 of second steering cylinder 22 urging piston 28 downwardly therein. Fluid is discharged from the lower piston chamber portion 69 through conduit 70 for return to tank T with the fluid being returned thereto from upper piston portion 65 of first steering cylinder 21, as described above.

The downward movement of the piston 28 carries with it the piston rod 31 so as to enlarge the chamber 36 therein relative to the fixed head 38 of the probe 37, thus drawing fluid from control valve chamber portion 61 through conduit 72. The concurrent delivery of hydraulic fluid from first steering cylinder 21 into the control valve chamber portion 60 and the delivery of fluid from control valve chamber portion 61 to second steering cylinder 22 restores the control valve 19 to the centered position of the spool valve member 41, as illustrated in FIG. 3, notwithstanding the relative displacement of the steerable device portions 12 and 13, as indicated in FIG. 3, as long as the steering wheel 16 is held in the turned position of FIG. 2.

Any change in the position of the steering wheel 16, however, instantaneously causes pump 15 to deliver hydraulic fluid to either chamber end 60 or chamber end 61 of the valve 19 so as to shift the movable spool valve member 41 temporarily to effect movement of the pistons 25 and 28. While the description of the operation of the mechanism 10 has been made in connection with a turning of the steering wheel 16 in a clockwise direction, as shown in FIG. 2, as will be obvious to those skilled in the art, a similar but reverse operation occurs when the steering wheel is turned in the counterclockwise direction. Thus, under such conditions, the piston 25 is lowered and the piston 28 is raised by a reversely similar flow of hydraulic fluid in the mechanism.

As indicated previously, the steering control mechanism of the present invention further permits a manual operation of the steering means in the event of failure of the pump 20, such as from a dead engine or pump breakage condition. Thus, illustratively, referring to FIG. 2, if the steering wheel 16 were turned so as to cause pump 15 to force fluid through lines 17 and 71, the thusly displaced fluid would open check valve 73 to permit the fluid to flow into chamber 65 of cylinder 21 and simultaneously through lines 66 and 70 to annular passage 47. The fluid would then be forced out of chamber 64 of cylinder 21 through line 63 to annular passage 43, and further through lines 75 and 68 into chamber 67 of cylinder 22. Resultingly, fluid is forced from chamber 36 through lines 72 and 18 back to the reverse side of the manually operable pump 15. Thus, while a substantial effort would be required by the operator to turn the steering wheel to effect such steering, a low rate of steering would be effected by the small output of the pump 15 and, thus, the operator would have some control of the steering notwithstanding the occurrence of a failure of pump 20.

The invention provides a substantial improvement over the conventional steering mechanism utilizing steering stops and relief valves for relieving high pressures in the fluids at the end of the steering travel. By utilizing ports in the control valve 19 to exhaust pressures to tank, the control valve is returned to the nonsteering position of FIG. 1 for an improved overall functioning of the fluid system.

As can be seen from the drawing, the control valve houses substantially the entire control mechanism. A minimum of fluid transfer lines is required, thus further minimizing the vulnerability of the structure to damage in the use of the vehicle.

Thus, the invention comprehends the use of an improved control valve having a normally centered movable spool valve member which is displaced selectively in opposite directions to provide a corresponding opposite movement of the pistons of a pair of steering control cylinders. The result of the movement of the pistons to the steered disposition, causes a delivery of hydraulic fluid from the piston devices back to the control valve so as to effect an automatic restoration of the spool valve member to the centered position when the steering devices and steering wheel are in correspondence.

The movement of the steering devices 11 may be limited by means of a port 76 in piston rod 29 and a similar port 77 in piston rod 31 which illustratively provide communication between the chambers 33 and 36 and the low pressure chamber of the steering cylinders 21 and 22 at a desired limit of movement of the pistons 25 and 28, respectively.

The foregoing disclosure of specific embodiments is illustrative of the broad inventive concepts comprehended by the invention.

The embodiments of the invention in which an exclusive property or privilege is claimed are defined as follows:

1. In a hydraulically operable steering mechanism having a manually operable steering element, a steering cylinder including wall means defining a piston chamber and a piston movable in said chamber, connecting means for connecting the piston to the device to be steered, pump means for providing pressurized hydraulic steering fluid, and a control valve having a movable valve member for controlling the delivery of pressurized fluid from the pump means to the piston chamber selectively to opposite sides of the piston therein to urge the connecting means selectively in opposite directions for effecting a steering movement of the device to be steered, the improvement comprising:

means for biasing said valve member to a nonsteering disposition;

hydraulic means for moving said movable valve member, as an incident of selective disposition of said steering element, from said nonsteering disposition to cause delivery of pressurized hydraulic fluid to said piston chamber selectively to effect a corresponding steering movement of the device to be steered; and restoring means responsive to movement of the device to be steered to hydraulically move said valve member back to the nonsteering disposition as a result of the device being disposed in the steering disposition corresponding to the selected steering disposition of the steering element.

2. The hydraulically operable steering mechanism of claim 1 wherein said control valve includes housing means defining a valve chamber, said movable valve member being selectively movable in opposed directions from said nonsteering disposition in said chamber, and said hydraulic means comprises means for selectively receiving and returning hydraulic fluid from said valve chamber to correspondingly permit and effect movement of the movable valve member.

3. The hydraulically operable steering mechanism of claim 1 wherein said control valve comprises a spool valve having a housing means defining a valve chamber, said movable valve member being selectively movable in opposite directions from said nonsteering disposition in said chamber, and said hydraulic means comprises means for selectively receiving and returning hydraulic fluid from said valve chamber to correspondingly permit and effect movement of the movable valve member.

4. The hydraulically operable steering mechanism of claim 1 wherein said restoring means comprises means for receiving hydraulic fluid from the control valve as a result of the movement of said movable valve member to effect said steering movement of the device, and returning the receiving hydraulic fluid to the control valve as a result of the device being disposed in said steering disposition.

5. The hydraulically operable steering mechanism of claim 1 further including a second steering cylinder and means connecting the piston of the second steering cylinder to the device for cooperation with the first said steering cylinder in positioning the device.

6. The hydraulically operable steering mechanism of claim 1 further including a second steering cylinder and means connecting the piston of the second steering cylinder to the device for cooperation with the first said steering cylinder in positioning the device, said restoring means comprising means associated with each of said cylinders for receiving hydraulic fluid from the control valve as a result of the movement of said movable valve member to effect said steering movement of the device, and returning the received hydraulic fluid to the control valve as a result of the device being disposed in said steering disposition.

7. In a hydraulically operable steering mechanism having a manually operable steering element, a steering cylinder including wall means defining a piston chamber and a piston movable in said chamber, connecting means for connecting the piston to the device to be steered, pump means for providing pressurized hydraulic steering fluid, and a control valve having means defining a valve chamber and a movable spool valve member reciprocably movable in said valve chamber for controlling the delivery of pressurized fluid from the pump means to the piston chamber selectively to opposite sides of the piston therein to urge the connecting means selectively in opposite directions for effecting a steering movement of the device to be steered, the improvement comprising:

means for biasing said spool valve member to a nonsteering disposition;

hydraulic means for moving said movable valve member, as an incident of selective disposition of said steering element selectively in opposite directions from said nonsteering disposition to cause delivery of pressurized hydraulic fluid to said piston chamber selectively to effect a corresponding alternatively opposite steering movement of the device to be steered; and restoring means responsive to movement of the device to be steered to hydraulically move said spool valve member back to the nonsteering disposition as a result of the device being disposed in the steering disposition corresponding to the selected steering disposition of the steering element.

8. The hydraulically operable steering mechanism of claim 7 wherein said pump means defines a high pressure outlet and low pressure inlet, and said spool valve means is arranged to selectively connect the piston chamber at either side of the piston to the pump means outlet and concurrently the other side of the piston to the pump means inlet to effect selectively the desired steering movement of the device.

9. The hydraulically operable steering mechanism of claim 7 wherein said pump means defines a high pressure outlet and a low pressure inlet, and said spool valve means is arranged to selectively connect the piston chamber at either side of the piston to the pump means outlet and concurrently the other side of the piston to the pump means inlet to effect selectively the desired steering movement of the device, said biasing means cooperating with the restoring means to return said spool valve member to said nonsteering disposition.

10. The hydraulically operable steering mechanism of claim 7 wherein said nonsteering disposition comprises a centered disposition of the spool valve member in said valve chamber.

11. The hydraulically operable steering mechanism of claim 7 wherein said restoring means comprises a selectively expansible and contractible fluid storage chamber means.

12. The hydraulically operable steering mechanism of claim 7 wherein said restoring means comprises a selectively expansible and contractible fluid storage chamber means having a variable volume corresponding to the disposition of said device.

13. The hydraulically operable steering mechanism of claim 7 wherein said restoring means comprises a selectively expansible and contractible fluid storage chamber means having a variable volume corresponding to the disposition of said piston.

14. The hydraulically operable steering mechanism of claim 7 wherein said restoring means comprises a selectively expansible and contractible fluid storage chamber means within said connecting means.

15. The hydraulically operable steering mechanism of claim 7 wherein said restoring means comprises a selectively expansible and contractible fluid storage chamber means within said connecting means and said piston.

16. The hydraulically operable steering mechanism of claim 7 wherein said connecting means includes a piston rod connected to said piston to extend to outwardly of said piston chamber, and said restoring means comprises a selectively expansible and contractible fluid storage chamber means.

17. The hydraulically operable steering mechanism of claim 7 wherein said restoring means comprises a selectively expansible and contractible fluid storage chamber means and hydraulically connected to said valve chamber and steering element.

18. In a hydraulically operable steering mechanism having a manually operable steering element, first and second steering cylinders each including wall means defining a piston chamber and a piston movable in said chamber, connecting means for connecting the pistons to a device to be steered, said device being turnable about a turning center and said connecting means connecting the respective pistons to the device at opposite sides of said turning center, pump means for providing pressurized hydraulic steerng fluid, and a control valve member having means defining a valve chamber and a movable spool valve member reciprocably movable in said valve chamber for controlling the delivery of pressurized fluid from the pump means to the piston chambers of said first and second steering cylinders selectively to opposite sides of the pistons therein to urge the connecting means selectively in opposite directions for effecting a steering movement of the device to be steered, the improvement comprising:

means for biasing said spool valve member to a nonsteering centered disposition;

hydraulic means for moving said movable valve member, as an incident of selective disposition of said steering element selectively in opposite directions, from said nonsteering disposition to cause delivery of pressurized hydraulic fluid to said piston chambers of said steering cylinders selectively to effect a corresponding alternatively opposite steering movement of the device to be steered; and restoring means responsive to movement of the device to be steered to hydraulically move said spool valve member back to the centered disposition as a result of the device being disposed in the steering disposition corresponding to the selected steering disposition of the steering element, said valve member connecting the steering cylinder to the pump means to urge the pistons thereof concurrently in opposite directions to effect a desired turning movement of the device in one direction, said valve member reversing the direction of the concurrent urging of the pistons to effect a desired turning movement of the device in a direction opposite to said one direction.

19. The hydraulically operable steering mechanism of claim 18 wherein said hydraulic and storing means cooperatively comprise variable volume storage means for concurrently receiving hydraulic fluid from one end of the valve chamber and providing hydraulic fluid to the opposite end of the valve chamber.

20. The hydraulically operable steering mechanism of claim 18 wherein said hydraulic and storing means cooperatively comprise variable volume storage means for concurrently receiving hydraulic fluid from one end of the valve chamber and providing hydraulic fluid to the opposite end of the valve chamber, said storage means being associated with each of said piston means.

21. The hydraulically operable steering mechanism of claim 18 wherein said hydraulic and storing means cooperatively comprise variable volume storage means for concurrently receiving hydraulic fluid from one end of the valve chamber and providing hydraulic fluid to the opposite end of the valve chamber, said storage means being disposed within each of said piston means.

22. The hydraulically operable steering mechanism of claim 18 wherein said hydraulic and storing means cooperatively comprise variable volume storage means for concurrently receiving hydraulic fluid from one end of the valve chamber and providing hydraulic fluid to the opposite end of the valve chamber, said storage means being disposed within each of said piston means and connecting means.

* * * * *